Patented July 26, 1949

2,477,049

UNITED STATES PATENT OFFICE 2,477,049

PYRIDOACRIDINES

James Dobson, Manchester, England, and William Chalmers Hutchison and William Ogilvy Kermack, Edinburgh, Scotland, assignors to Imperial Chemical Industries Limited, a corporation of Great Britain No Drawing. Application February 15, 1946, Serial No. 647,996. In Great Britain February 17, 1945

4 Claims. (Cl. 260—279)

This invention relates to the manufacture of new pyridoacridine derivatives which are useful as chemotherapeutic agents. They are distinguished by their parasiticidal action, particularly against malaria parasites.

We have now found that new parasiticides, namely 1:2:3':2'-pyridoacridines optionally bearing in either or both of the 3- and 6-positions a non-acidic substituent, for example, a halogen atom or an alkyl group, and bearing in the 9-position a substituted amino group of the form —NH—A—NRR', can be made by a process comprising either the interaction of a diamine $NH_2$—A—NRR' with a 1:2:3':2'-pyridoacridine appropriately substituted if necessary in either or both of the 3- and 6-positions and bearing in the 9-position a labile substituent such as a halogen atom or an alkoxy or aryloxy or alkyl- or aryl-mercapto group, or the interaction of a cyclising agent as hereinafter defined with a 2-(quinolyl-(6')-amino)-benzamide substituted on the amido nitrogen by the group —A—NRR' and optionally bearing a simple non-acidic substituent in either or both of the 4- and 8'-positions.

In the above formulae A is a linking group which is aliphatic or alicyclic or aliphatic-carbocyclic and may be substituted, for example, by hydrocarbon radicals, hydroxy or alkoxy groups, or dialkylaminoalkyl groups and, where A or part of A is an aliphatic chain, it may be interrupted by oxygen, nitrogen or sulphur atoms, and NRR' is a strongly basic amino or substituted amino group such as alkylamino or dialkylamino or piperidino or other strongly basic nitrogen-containing heterocyclic group.

For clarity it may be mentioned that in this specification the numbering used for the acridine ring is that adopted by Beilstein (see 4th edition, vol. 20, p. 459).

The cyclising agent to be used in the second embodiment of the invention is the pentachloride, pentabromide, oxychloride or oxybromide of phosphorus or a mixture of such compounds, for example, a mixture of phosphorus pentachloride and phosphorus oxychloride.

In practising the embodiments of the invention, the reaction is conveniently effected by heating the reagents together, optionally in presence of a solvent or diluent. If desired, the diamine $NH_2$—A—NRR' may be used in the form of a salt, such as the hydrochloride or acetate.

As examples of diamines suitable for use as starting materials in the first embodiment of the invention and likewise for interaction with the appropriate 2-(quinolyl-(6')-amino)-benzoyl chlorides to make the benzamides used as starting materials in the second embodiment of the invention there may be mentioned ethylene diamine, 2-dimethylaminoethylamine, 2-diethylaminoethylamine, 3-dimethylaminopropylamine, 3-diethylaminopropylamine, 4-diethylamino-butylamine, 4-diethylamino-1-methyl-butylamine, 3-diethylamino-1:2-dimethylpropylamine, 3-diethylamino-2-hydroxypropylamine, 2-methylaminoethylamine, 3-butylaminopropylamine, 3-dibutylaminopropylamine, 3-(β-diethylaminoethoxy)-propylamine, 3-(β-diethylaminoethylmercapto)-propylamine, 5-diethylamino-1-aminopentane, 2-pyrrolidinoethylamine, 1:3-bis-diethylamino-2-aminopropane, N-ethyl-N-β-diethylaminoethyl-ethylenediamine, 2-piperidinoethylamine, 3-piperidinopropylamine, p-(β-dimethylaminoethoxy)-aniline, p-(β-diethylaminoethoxy)-aniline, p-(β-diethylaminoethylmercapto)-aniline, 3-diethylamino-2:2-dimethylpropylamine, N-methyl-N-β-diethylaminoethyl-trimethylenediamine and β-piperidino-α-methyl-ethylamine.

The new compounds are yellow crystalline solids or orange coloured viscous oils. They are strongly basic and form salts with organic acids such as acetic, picric and 3:5-dinitrobenzoic acids.

The following examples illustrate, but do not limit, the invention. The parts are by weight.

Example 1

5.3 parts of 9-chloro-1:2:3':2'-pyridoacridine are mixed in a pressure vessel with 3.5 parts of 2-amino-5-diethylamino-pentane and a trace of copper bronze. The vessel is evacuated and heated at 100° C. for 2 hours to remove all traces of moisture. It is then sealed and heated at 200° C. for 6 hours and the contents are extracted with ether which in turn is extracted with 5% acetic acid. The acid solution is filtered and the filtrate is made alkaline with ammonia whereby the 9-(δ-diethylamino-α-methyl-butylamino)-1:2:3':2'-pyridoacridine is precipitated in an oily state. The base is extracted with ether, the ether extracts dried over anhydrous potassium carbonate and the ether removed by distillation. The orange-yellow oil remaining is conveniently converted into the canary yellow crystalline picrate by adding a saturated solution of picric acid in ether to an ether solution of the base. The picrate is filtered off and recrystallised from alcohol; it then melts at 121° C.

Example 2

50 parts of distilled phenol are dried in a vacuum at 100° C. for 2 hours, 2.5 parts of β-diethylaminoethylamine are added and the mixture is heated at 100° C. in a vacuum for a further hour to remove traces of water. 5.3 parts of carefully dried 9 - chloro - 1:2:3':2' - pyridoacridine are added and the mixture is heated at 100° C. under reflux for 2 hours, by which time the reaction is complete. The mixture is cooled and poured into 2-normal sodium hydroxide solution, whereupon the 9 - (β - diethylaminoethylamino)-1:2:3':2'-pyridoacridine separates in a semi-solid form and is extracted with ether. The base is purified by shaking the ether extract with 5% acetic acid, reprecipitating with ammonia and re-extracting with ether. This ether extract is dried over anhydrous potassium carbonate and the ether is removed by distillation. The residual sticky solid is conveniently recrystallised from ligroin from which it separates in yellow needles M. P. 92° C.

By working in the manner described in Example 2, but using other appropriate starting materials there are obtained the following further compounds:

Example 3

6 - chloro - 9 - (β - diethylaminoethylamino) - 1:2:3':2'-pyridoacridine which crystallised from ligroin has M. P. 127° C.

Example 4

6-chloro-9-(δ - diethylamino-α-methyl - butylamino)-1:2:3':2'-pyridoacridine which is an oil. It yields an acetate, M. P. 76°–78° C., by dissolving in 5% acetic acid and evaporating the solution to dryness under diminished pressure. The picrate may be obtained by adding a saturated solution of picric acid in ether to an ether solution of the base; when recrystallised from ethanol it forms yellow needles of M. P. 216° C.

Example 5

6 - chloro - 9 - (γ - diethylaminopropylamino) - 1:2:3':2'-pyridoacridine which crystallised from ligroin has M. P. 119.5°–120° C.

Example 6

6 - chloro-9-(γ - dimethylaminopropylamino) - 1:2:3':2'-pyridoacridine which crystallised from ligroin has M. P. 127° C.

Example 7

6-chloro-9-γ-(β'-diethylaminoethoxy)-propyl - amino-1:2:3':2'-pyridoacridine; this is an orange oil which yields a 3:5-dinitrobenzoate which crystallises from ethanol in pale yellow needles of M. P. 214° C.

Example 8

6 - chloro - 9 - (γ - piperidinopropylamino) - 1:2:3':2'-pyridoacridine; this is a dark red-brown oil which forms a picrate which crystallises from ethanol in pale yellow needles of M. P. 145° C.

Example 9

7 parts of 6-chloro-9-phenoxy-1:2:3':2'-pyridoacridine (conveniently made by heating 6:9-dichloro-1:2:3':2'-pyridoacridine in dry phenol at 160° C. for 4 hours and then pouring the reaction mixture into 2-normal sodium hydroxide solution when the product separates as a solid which, crystallised from ligroin, has M. P. 218° C.) are heated for 3 hours at 100° C. with a mixture of 2.5 parts of β-diethylaminoethylamine and 50 parts of dry phenol. The mixture is then cooled and worked up as described in Example 2. The base so obtained has M. P. 127° C. and is identical with the product of Example 3.

Example 10

6 parts of 3:6:9-trichloro-1:2:3':2'-pyridoacridine are heated at 100° C. for 2 hours with a mixture of 2.5 parts of γ-diethylamiopropylamine and 50 parts of phenol previously dried in the manner described in Example 2. The reaction mixture is then cooled and poured into 2-normal sodium hydroxide solution. 3:6-dichloro-9-(γ-diethylaminopropylamino) - 1:2:3':2' - pyrido - acridine separates out; after crystallisation from ligroin it has M. P. 144° C.

By working in the manner described in Example 10 but using other appropriate starting materials there are obtained the following further compounds:

Example 11

3:6 - dichloro - 9-(γ-butylaminopropylamino)-1:2:3':2'-pyridoacridine which crystallised from ligroin has M. P. 131° C.

Example 12

3 - chloro - 9 - (γ-diethylaminopropylamino)-1:2:3':2'-pyridoacridine which crystallised from ligroin has M. P. 115° C.

Example 13

3 - methyl-6-chloro-9-(γ-diethylaminopropylamino) - 1:2:3':2' - pyridoacridine which crystallised from ligroin has M. P. 110° C.

Example 14

To 6.3 parts of 4-chloro-2-(8'-chloroquinolyl-(6')-amino)-benzoyl chloride (made by interaction of 4 - chloro - 2 - (8'-chloroquinolyl-(6')-amino)-benzoic acid and thionyl chloride in chloroform) there is added a chloroform solution of 3 parts of γ-butylaminopropylamine and the mixture is heated under reflux for 1 hour. The chloroform is then distilled off and the 4-chloro-2-(8'-chloroquinolyl-(6')-amino)-benz-(γ-butylaminopropyl)-amide hydrochloride remaining is refluxed for 2 hours with 43 parts of phosphorus oxychloride. The phosphorus oxychloride is then distilled off under diminished pressure and the oil remaining is dissolved in ice water. The solution is filtered and the filtrate is made alkaline with ammonia, whereupon crude 3:6-dichloro - 9 - (γ - butylaminopropylamino) - 1:2:3':2'-pyridoacridine separates out. It is filtered off and recrystallised from ligroin when it has M. P. 131° C.

Example 15

6 parts of 6:9 - dichloro-1:2:3':2'-pyridoacridine are heated with a mixture of 50 parts of phenol and 2.9 parts of monobutylaminopropylamine (which has been dried as described in Example 2) at 100° C. for 2 hours. The 6-chloro-9-(γ - butylaminopropyl)-amino-1:2:3':2'-pyridoacridine is then isolated as described in Example 2. It is obtained in yellow needles, M. P. 78° C. by crystallising from ligroin.

Example 16

6 parts of 6:9 - dichloro-1:2:3':2'-pyridoacridine are added to a mixture of 50 parts of redistilled phenol and 3.2 parts of δ-diethylaminobutylamine which has been dried as described in Example 2. The reaction mixture is heated at 100° C. for 2 hours and the 6-chloro-9-

(δ - diethylaminobutyl)-amino-1:2:3'-2'-pyridoacridine is then isolated as described in Example 2. The base is obtained as an orange oil which may be converted into the picrate by adding a saturated solution of picric acid in ether to an ether solution of the base. When recrystallised from ethyl alcohol it forms yellow needles, M. P. 168° C.

The base yields a well defined crystalline dinitrobenzoate by adding a saturated alcoholic solution of 3:5-dinitrobenzoic acid to a solution of the base in alcohol. This salt may be conveniently recrystallised from alcohol to yield very small pale yellow needles, M. P. 233° C. This dinitrobenzoate is specially convenient for the purification of the base.

*Example 17*

A solution of 6.0 parts of 4-chloro-2-(quinolyl-(6')-amino)-benzoyl chloride (made by interaction of 4-chloro-2-(quinolyl-(6')-amino)-benzoic acid with thionyl chloride in chloroform as is described in Example 4 of our copending application Serial No. 647,995 of even date herewith) in 50 parts of chloroform is heated for one hour at 100° C. with a solution of 2.6 parts of β-diethylaminoethylamine in 15 parts of chloroform. The chloroform is then distilled off whereby 4-chloro - 2 - (quinolyl - (6') - amino) -benz-(β-diethylaminoethyl)-amide hydrochloride is obtained. This is refluxed for 2 hours with 20 parts of phosphorus oxychloride. Hydrogen chloride is evolved and the mixture becomes dark red. Phosphorus oxychloride is then distilled off under reduced pressure and the thick dark red oil remaining is dissolved in ice water. The brown solution so obtained is filtered and the filtrate is made alkaline with ammonia whereupon crude 6 - chloro - 9 - (β-diethylaminoethyl)-amino-1:2:3':2'-pyridoacridine separates in an oily state. The base is extracted with ether and purified by shaking the ether extract with 5% acetic acid, reprecipitating with ammonia and re-extracting with ether. This ether extract is then dried over anhydrous potassium carbonate and the ether is distilled off. The residual oil is dissolved in hot ligroin and the solution is cooled. The base again separates in an oily state but repetition of this process ultimately yields 6-chloro - 9 - (β - diethylaminoethyl) - amino-1:2:3':2'-pyridoacridine in the form of yellow needles of M. P. 127° C. which show no depression when mixed wth a sample obtained as described in Example 3.

Whereas the above description and examples illustrate many widely varied embodiments of the invention it will be apparent to one skilled in the art that many other embodiments and variations may be devised without departing from the spirit and scope thereof and accordingly it is to be understood that the invention is not in any way limited except as defined in the following claims.

We claim:

1. A compound of the general formula

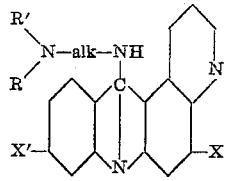

wherein alk stands for an alkylene radical of between 2-5 carbon atoms inclusive, R and R' are members of the group consisting of hydrogen and lower alkyl, while X and X' represent members selected from the group consisting of hydrogen, halogen and alkyl.

2. 3:6-dichloro- 9-γ-diethylaminopropylamino-1:2:3':2'-pyridoacridine.

3. 6-chloro-9-δ-diethylamino - α -methylbutylamino-1:2:3':2'-pyridoacridine.

4. 6-chloro - 9 - γ - mono-n-butylaminopropylamino-1:2:3':2'-pyridoacridine.

JAMES DOBSON.
WILLIAM CHALMERS HUTCHISON.
WILLIAM OGILVY KERMACK.

REFERENCES CITED

The following references are of record in the file of this patent:

UNITED STATES PATENTS

| Number | Name | Date |
|---|---|---|
| 1,782,727 | Jensch et al. | Nov. 25, 1930 |
| 1,962,277 | Jensch et al. | June 12, 1934 |
| 2,113,357 | Mietzsch et al. | Apr. 5, 1938 |
| 2,389,147 | Friedheim | Nov. 20, 1945 |

OTHER REFERENCES

Berichte, 39, 298–310, 356–369 (1906).
Berichte, 55, 2049–2058 (1922).
Sidgwick, "Organic Chemistry of Nitrogen" (Oxford University Press, 1937); pages 522 and 523.
Berichte, 75, 1008–1015 (1942).
J. Am. Chem. Soc., 64, 2894–2898 (1942).